United States Patent [19]

Ishikuro et al.

[11] Patent Number: 4,661,421
[45] Date of Patent: Apr. 28, 1987

[54] METHOD FOR PREPARING A MAGNETIC RECORDING MEDIUM

[75] Inventors: Tadashi Ishikuro; Kunihiko Honda; Masataka Ohta; Ryuji Shirahata, all of Kanagawa, Japan

[73] Assignee: Fuji Photo Film Co., Ltd., Kanagawa, Japan

[21] Appl. No.: 906,008

[22] Filed: Sep. 11, 1986

[30] Foreign Application Priority Data

Sep. 13, 1985 [JP] Japan ................. 60-202794

[51] Int. Cl.$^4$ ................................ G11B 5/64
[52] U.S. Cl. ................... 428/694; 427/129; 427/132; 427/177; 427/250; 427/314; 427/398.1; 428/900
[58] Field of Search ............. 428/694, 900; 427/132, 427/171, 250, 251, 177, 314, 398.1, 129

[56] References Cited

U.S. PATENT DOCUMENTS 4,446,170 5/1984 Watanabe ................ 427/177
4,474,832 10/1984 Shirahata et al. ............ 427/132

Primary Examiner—Paul J. Thibodeau
Attorney, Agent, or Firm—Sughrue, Mion, Zinn, Macpeak & Seas

[57] ABSTRACT

A method is described for preparing a magnetic recording medium by vapor-depositing a magnetic metal thin film on a polyester film, which comprises winding up a polyester film while subjecting the polyester film to a tension of from 0.1 to 2.0 kg/mm$^2$, heating the resulting polyester film roll at 60° C. to 80° C. for from 10 to 100 hours, and vapor-depositing a magnetic thin film onto the polyester film while subjecting the polyester film to a tension of 0.5 kg/mm$^2$ or more.

6 Claims, No Drawings

METHOD FOR PREPARING A MAGNETIC RECORDING MEDIUM

FIELD OF THE INVENTION

The present invention relates to a method for preparing a magnetic recording medium which comprises forming a ferromagnetic metal thin film on a polyester film.

BACKGROUND OF THE INVENTION

A coated type magnetic recording medium that has been widely used is prepared by dispersing magnetic oxide particles such as $\gamma$—$Fe_2O_3$, Co-doped $\gamma$—$Fe_2O_3$, $Fe_3O_4$, Co-doped $Fe_3O_4$, a Berthollide compound of $\gamma$—$Fe_2O_3$ and $Fe_3O_4$, a Co-doped Berthollide compound or $CrO_2$, or magnetic alloy particles mainly composed of Fe, Co, Ni and the like in an organic binder such as a copolymer of vinyl chloride and vinyl acetate, a copolymer of styrene and butadiene, an epoxy resin or a polyurethane resin, coating the resulting coating composition on a non-magnetic support, and drying it.

With the increased demand for high density recording, a thin metal film type magnetic recording medium, of which ferromagnetic metal thin film is prepared by vapor deposition, sputtering, or ion plating without using a binder has drawn attention and has been developed to put into practice.

A conventional coated type magnetic recording medium uses magnetic metal oxide particles having low saturation magnetization. Therefore, when a magnetic recording layer is made thinner in order to realize high density recording, the output of the signals is decreased.

On the other hand, a thin metal film type magnetic recording medium uses ferromagnetic particles having higher saturation magnetization than magnetic metal oxide particles in the absence of a binder to prepare a magnetic recording layer. Therefore, the resulting magnetic recording layer can be made extremely thin and exhibits excellent electromagnetic properties.

Upon preparing a magnetic tape by forming a magnetic film on a tape-shape non-magnetic support by a vapor deposition, a polyester film is widely used as a non-magnetic support.

When a magnetic tape is prepared on a polyester film by a vapor deposition method, there are problems as to characteristics of a magnetic tape due to heat treatment at vapor deposition. One of the problems is a skew characteristic (i.e., a distortion of an image which is caused by shrinkage of tape in the running direction). It is proposed in Japanese Patent Publication No. 202794/85 to conduct heat treatment after vapor deposition in order to overcome the above problem, however, there is also a problem in this method that a crack is formed on a vapor deposited film. It is also proposed in Japanese Patent Application (OPI) No. 135632/84 (the term "OPI" as used herein means an "unexamined published application") that a coated type magnetic layer is provided on a film after the polyester film is subjected to heat treatment. However, in this method, skew problems cannot be overcome, and electromagnetic properties are also deteriorated, because in a magnetic recording medium prepared by a vapor deposition method, the film undergoes heat treatment upon vapor deposition.

SUMMARY OF THE INVENTION

A first object of the present invention is to provide a vapor deposition method for preparing a thin metal film type magnetic recording medium having an improved skew characteristic.

A second object of the present invention is to provide a vapor deposition method for preparing a metal thin film type magnetic recording medium having excellent S/N characteristics of chroma signals and excellent reproduced signal envelope at wide wavelength regions.

The present invention relates to a method for preparing a magnetic recording medium by vapor-depositing a magnetic metal film on a polyester film, which comprises winding up a polyester film while subjecting the polyester film to a tension of from 0.1 to 2.0 kg/mm$^2$, heating the resulting polyester film roll at from 60° C. to 80° C. for from 10 to 100 hours, and vapor-depositing a magnetic metal film onto the polyester film while subjecting the polyester film to a tension of 0.5 kg/mm$^2$ or more.

DETAILED DESCRIPTION OF THE INVENTION

"Tension" referred to herein is defined as a force added to a cross-section of a polyester film. As a result of investigations it was found that skew characteristics, chroma S/N, and envelope of outputs of reproduced signals at wide wavelength regions can be improved by a magnetic recording medium which is prepared by the method which comprises winding up a polyester film while subjecting the polyester film to a tension of from 0.1 to 2.0 kg/mm$^2$, preferably from 0.1 to 1.6 kg/mm$^2$, and more preferably from 0.6 to 1.2 kg/mm$^2$, heating it at from 60° C. to 80° C. for from 10 to 100 hours, preferably from 20 to 72 hours, and vapor-depositing a magnetic film onto the polyester film, while subjecting the polyester film to a tension of 0.5 kg/mm$^2$ or more.

The vapor-deposited magnetic metal thin film of the present invention is composed of metals such as Fe, Co, Ni, and the like or ferromagnetic alloys such as Fe—Co, Fe—Ni, Co—Ni, Fe—Co—Ni, Fe—Rh, Fe—Cu, Fe—Si, Co—Cu, Co—Au, Co—Y, Co—La, Co—Pr, Co—Gd, Co—Sm, Co—Pt, Co—Si, Co—Mn, Co—P, Ni—Cu, Mn—Bi, Mn—Sb, Mn—Al, Fe—Cr, Co—Cr, Ni—Cr, Fe—P, Ni—P, Co—Ni—P, Co—Ni—B, Co—Ni—Ag, Co—Ni—Cr, Fe—Co—Cr, Fe—Co—Ni—Cr, Co—Ni—Zn, Co—Ni—W, or Fe—Co—Ni—P. Among these, preferably a metal or ferromagnetic alloy containing Co is used, and more preferably a metal or ferromagnetic alloy containing 50 wt% or more of Co per the total weight of the magnetic metal is used. The thickness of the magnetic film is generally from 0.02 to 5.0 microns, preferably from 0.05 to 2.0 microns, and more preferably from 0.07 to 1.5 microns so that sufficient output can be produced as a magnetic recording medium and that high density recording can be carried out satisfactorily.

By introducing gas such as $O_2$, $Co_2$, $N_2$, $NH_3$, or styrene during vapor deposition, elements such as O, N, C, and the like can be incorporated into a magnetic metal thin film.

A polyester film used in the present invention is not limited. Specific examples thereof include polyethylene terephthalate, polymethylene terephthalate, polyethylene-2-6-naphthalate, and polyethylene isophthalate.

The thickness of the polyester film is generally from 2 to 100 microns, preferably from 3 to 50 microns, and more preferably from 5 to 20 microns.

In addition to the above, Ga, As, Sr, Zr, Nb, Mo, Sn, Sb, Te, Os, Ir, Au, Ag, Pb, Bi, and the like can be incorporated into the ferromagnetic metal thin film for a purpose of improving the magnetic properties (e.g., coercive force, saturated magnetic flux density, etc.). An amount of these metals used is preferably from 0 to 10 wt%, and more preferably from 0 to 5 wt% per total weight of ferromagnetic metal thin film.

Upon vapor-depositing a ferromagnetic metal thin film on a polyester film in the present invention, it is preferred that the non-vapor deposited surface of the polyester film be contacted with a cooling roller cooled to a temperature of generally from $-50°$ C. to $10°$ C., preferably from $-40°$ C. to $5°$ C., and more preferably from $-30°$ C. to $5°$ C. The tension to which the film is subjected during vapor deposition in the present invention is 0.5 kg/mm$^2$ or more, and preferably 0.6 kg/mm$^2$ or more and it is practical that the upper limit of the tension is about $\frac{1}{4}$, and preferably about 1/5, that of the breaking strength of the polyester film.

In the present invention, the ferromagnetic film may be a single layer or a multi-layer as described in U.S. Pat. No.4,410,583, and a non-magnetic layer (as interlayer) can be present between the magnetic layers. Further, as described in U.S. Pat. No. 4,245,008, an underlayer may be provided between a polyester film and a ferromagnetic metal thin film, which compose a magnetic layer, and a protective layer or a lubricating layer may also be provided on a magnetic layer as described in U.S. Pat. Nos. 4,333,985 and 4,425,404. Still further, a backing layer may be provided on the surface of a polyester film opposite to the surface having a magnetic layer.

When the above-described interlayer, the underlayer, protective layer, and the like are vapor deposited, it is preferred that a tension of 5 kg/mm$^2$ or more needs to be added. When these interlayer, underlayer, protective layer, and the like are provided by a wet coating method, generally used drying conditions can be applied. Thus, a vapor deposition type magnetic recording medium having improved skew characteristics and electromagnetic properties can be obtained by a specific selecting of conditions which are subjected to heat treatment before vapor deposition, and during vapor deposition.

The present invention is further illustrated in more detail by the following Examples, but is not limited thereto.

EXAMPLE 1

Polyethylene terephthalate film having a thickness of 12.5 microns, a width of 500 mm, and a length of 5000 m was wound having various tensions, was subjected to heat treatment under various conditions (i.e., various heating temperatures and various heating periods) and then a ferromagnetic metal thin film was vapor deposited by a continuous vapor deposition apparatus on a polyethylene terephthalate film, to which various tensions were being added. The resulting ferromagnetic metal thin film was the film prepared by an oblique incident evaporation method and composed of Co-Ni alloy (Ni content: 20 wt%, Oxygen content: 14 atomic%), and having a thickness of 1800 Å.

The thus obtained various magnetic tape webs were slit to a width of 8 mm to prepare standard size magnetic tapes.

The following tests were carried out on the samples obtained, and the results thereof are shown in Table 1.

1. Skew characteristics:

Magnetic tapes on which recording was conducted using a 8 mm VTR "FUJIX-8 m 6," (trademark for product of Fuji Photo Film Co., Ltd.) at 25° C. and 70% RH (relative humidity) were allowed to stand for 48 hours at 70° C. and under dry condition, and then skew was measured by reproducing the tapes at 25° C. and 70% RH. Thus, the magnetic tapes having a skew value of 25 $\mu$sec or less are suitable for practical use.

2. Electromagnetic properties:

S/N (signal/noise) ratio of chroma signals, and the envelope upon recording and reproducing 5 MHZ signals were measured using the 8 mm VTR.

The evaluation of the envelope was made on the following five grades in view of its shape.

A: very good
B: good
C: average
D: poor
E: worst

TABLE 1

| Sample No. | Heating conditions | | | Tension during vapor deposition (kg/mm$^2$) | Skew ($\mu$sec) | Electromagnetic properties | |
|---|---|---|---|---|---|---|---|
| | Tension during winding step (kg/mm$^2$) | Temp. (°C.) | Time (hours) | | | CS/N (dB) | Envelope |
| 1 | 1.2 | 50 | 48 | 1.0 | 30 or more | 3.0 | C |
| 2 | 1.2 | 60 | 48 | 1.0 | 15 | 4.5 | B |
| 3 | 1.2 | 70 | 48 | 1.0 | 10 | 5.0 | A |
| 4 | 1.2 | 80 | 48 | 1.0 | 9 | 4.8 | B |
| 5 | 1.2 | 90 | 48 | 1.0 | 15 | 0.2 | D |
| 6 | 1.2 | 70 | 5 | 1.5 | 30 or more | 2.9 | B |
| 7 | 1.2 | 70 | 10 | 1.5 | 17 | 4.9 | A |
| 8 | 1.2 | 70 | 50 | 1.5 | 12 | 4.8 | A |
| 9 | 1.2 | 70 | 100 | 1.5 | 12 | 4.2 | B |
| 10 | 1.2 | 70 | 150 | 1.5 | 14 | 0.0 | D |
| 11 | 0.05 | 75 | 72 | 2.0 | 27 | −1.5 | E |
| 12 | 0.1 | 75 | 72 | 2.0 | 18 | 3.9 | B |
| 13 | 1.0 | 75 | 72 | 2.0 | 16 | 4.8 | B |
| 14 | 2.0 | 75 | 72 | 2.0 | 15 | 4.8 | B |
| 15 | 3.0 | 75 | 72 | 2.0 | 15 | 2.8 | B |
| 16 | 0.6 | 65 | 96 | 0.1 | 28 | −0.5 | E |
| 17 | 0.6 | 65 | 96 | 0.3 | 19 | 0.2 | E |
| 18 | 0.6 | 65 | 96 | 0.5 | 13 | 3.8 | B |

TABLE 1-continued

| Sample No. | Heating conditions | | | Tension during vapor deposition (kg/mm²) | Skew (μsec) | Electromagnetic properties | |
|---|---|---|---|---|---|---|---|
| | Tension during winding step (kg/mm²) | Temp. (°C.) | Time (hours) | | | CS/N (dB) | Envelope |
| 19 | 0.6 | 65 | 96 | 1.0 | 12 | 5.2 | A |
| 20 | 0.6 | 65 | 96 | 2.0 | 12 | 4.6 | A |
| 21 | 0.6 | 65 | 96 | 3.0 | 12 | 4.2 | B |

EXAMPLE 2

On a polyethylene terephthalate film having a thickness of 9.5 μm, a width of 600 mm, and a length of 7500 m, a ferromagnetic metal thin film was vapor deposited by a continuous vapor deposition apparatus while the polyester film was subjected to various tensions, after which the film was subjected to heat treatment in the same manner as in Example 1. The ferromagnetic metal thin film was composed of CoCr alloy (Cr content: 15 wt%), and having a thickness of 2200 Å. Thus various magnetic tape webs were prepared, and followed by slitting as in Example 1. The skew characteristics and electromagnetic properties of the thus obtained tapes were evaluated in the same manner as in Example 1, and the results thereof are shown in Table 2.

TABLE 2

| Sample No. | Heating conditions | | | Tension during vapor deposition (kg/mm²) | Skew (μsec) | Electromagnetic properties | |
|---|---|---|---|---|---|---|---|
| | Tension during winding step (kg/mm²) | Temp. (°C.) | Time (hours) | | | CS/N (dB) | Envelope |
| 22 | 0.06 | 60 | 96 | 1.6 | 22 | −1.0 | D |
| 23 | 0.1 | 60 | 96 | 1.6 | 18 | 4.0 | B |
| 24 | 0.6 | 60 | 96 | 1.6 | 15 | 5.2 | B |
| 25 | 1.8 | 60 | 96 | 1.6 | 15 | 5.2 | A |
| 26 | 3.2 | 60 | 96 | 1.6 | 15 | 2.2 | B |
| 27 | 1.8 | 50 | 48 | 1.6 | 30 or more | 3.9 | C |
| 28 | 1.8 | 80 | 48 | 1.6 | 12 | 5.7 | B |
| 29 | 1.8 | 90 | 48 | 1.6 | 12 | 0.8 | E |
| 30 | 1.2 | 70 | 6 | 0.8 | 30 or more | 5.0 | B |
| 31 | 1.2 | 70 | 12 | 0.8 | 18 | 5.7 | A |
| 32 | 1.2 | 70 | 72 | 0.8 | 14 | 5.6 | B |
| 33 | 1.2 | 70 | 96 | 0.8 | 13 | 5.5 | C |
| 34 | 1.2 | 70 | 112 | 0.8 | 13 | 2.8 | D |
| 35 | 0.8 | 75 | 72 | 0.2 | 22 | 0.3 | E |
| 36 | 0.8 | 75 | 72 | 0.5 | 15 | 3.9 | C |
| 37 | 0.8 | 75 | 72 | 1.6 | 15 | 4.9 | A |
| 38 | 0.8 | 75 | 72 | 3.2 | 15 | 5.2 | B |

In conclusion, excellent skew characteristics and electromagnetic properties of a magnetic tape are obtained when the magnetic tape is prepared by vapor depositing a magnetic layer while subjecting the polyester film to a tension of 0.5 kg/mm², after the polyester film has been wound while subjected to a tension of from 0.1 to 2.0 kg/mm² and subjected to heat treatment at from 60° C. to 80° C. for from 10 to 100 hours.

In accordance with the method of the present invention, a thin metal film type magnetic recording medium having excellent skew characteristics, chroma S/N ratio and envelope can be obtained.

While the invention has been described in detail and with reference to specific embodiments thereof, it will be apparent to one skilled in the art that various changes and modification can be made therein without departing from the spirit and scope thereof.

What is claimed is:

1. A method for preparing a magnetic recording medium by vapor depositing a magnetic metal thin film on a polyester film, which comprises winding up a polyester film while subjecting the polyester film to a tension of from 0.1 to 2.0 kg/mm², heating the resulting polyester film roll at from 60° C. to 80° C. for from 10 to 100 hours, and vapor depositing a magnetic metal thin film onto the polyester film while subjecting the polyester film to a tension of 0.5 kg/mm² or more.

2. A method for preparing a magnetic recording medium as in claim 1, wherein the magnetic metal thin film is vapor deposited to form a film thickness of from 0.05 to 2.0 microns.

3. A method for preparing a magnetic recording medium as in claim 1, wherein the thickness of the polyester film is from 2 to 100 microns.

4. A method for preparing a magnetic recording medium as in claim 1, which comprises winding up a polyester film while subjecting the polyester film to a tension of from 0.1 to 1.6 kg/mm², heating the resulting polyester film roll at from 60° C. to 80° C. for from 20 to 72 hours, and vapor-depositing a magnetic thin film onto the polyester film while subjecting the polyester film to a tension of 0.6 kg/mm² or more.

5. A method for preparing a magnetic recording medium as in claim 1, wherein the non-vapor-deposited surface of the polyester film is contacted with a cooling roller cooled to a temperature of from 31 50° C. to 10° C. during the vapor deposition of the magnetic metal thin film onto the polyester film.

6. A magnetic recording medium comprising a vapor-deposited magnetic thin film on a polyester film, wherein said magnetic recording medium is formed by a method which comprises winding up a polyester film while subjecting the polyester film to a tension of from 0.1 to 2.0 kg/mm², heating the resulting polyester film roll at from 60° C. to 80° C. for from 10 to 100 hours, and vapor depositing a magnetic thin film onto the polyester film while subjecting the polyester film to a tension of 0.5 kg/mm² or more.

* * * * *